US009641417B2

(12) United States Patent
Jiang et al.

(10) Patent No.: US 9,641,417 B2
(45) Date of Patent: May 2, 2017

(54) PROACTIVE DETECTION OF HOST STATUS IN A COMMUNICATIONS NETWORK

(71) Applicant: CISCO TECHNOLOGY, INC., San Jose, CA (US)

(72) Inventors: Yuefeng Jiang, Shanghai (CN); Xiaopu Zhang, Shanghai (CN); Fang Yang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 14/570,821

(22) Filed: Dec. 15, 2014

(65) Prior Publication Data

US 2016/0173356 A1    Jun. 16, 2016

(51) Int. Cl.
*H04L 12/26* (2006.01)
*H04L 29/06* (2006.01)
*H04L 12/751* (2013.01)

(52) U.S. Cl.
CPC ............ *H04L 43/12* (2013.01); *H04L 43/062* (2013.01); *H04L 45/026* (2013.01); *H04L 69/28* (2013.01)

(58) Field of Classification Search
CPC ......... H04L 45/00; H04L 45/20; H04L 45/28; H04L 45/026; H04L 45/745; H04L 45/586; H04L 12/4633; H04L 43/10; H04L 43/12; H04L 43/062; H04L 69/28
See application file for complete search history.

(56) References Cited

U.S. PATENT DOCUMENTS

| | | | |
|---|---|---|---|
| 8,166,205 B2 | 4/2012 | Farinacci et al. | |
| 2008/0285436 A1* | 11/2008 | Robinson | H04L 12/4633 370/217 |
| 2012/0173694 A1* | 7/2012 | Yan | H04L 12/4641 709/223 |
| 2012/0331542 A1* | 12/2012 | Halpern | H04L 63/1458 726/13 |
| 2013/0138764 A1 | 5/2013 | Satapathy et al. | |
| 2013/0281146 A1 | 10/2013 | Walton et al. | |
| 2014/0013324 A1 | 1/2014 | Zhang et al. | |
| 2014/0078887 A1* | 3/2014 | Yu | H04L 43/0811 370/219 |
| 2014/0208049 A1 | 7/2014 | Furusawa et al. | |
| 2014/0250220 A1 | 9/2014 | Kapadia et al. | |
| 2016/0014025 A1* | 1/2016 | Wang | H04L 45/00 370/392 |

\* cited by examiner

*Primary Examiner* — Yemane Mesfin
*Assistant Examiner* — Peter Chen
(74) *Attorney, Agent, or Firm* — Cindy Kaplan

(57) ABSTRACT

In one embodiment, a method includes receiving a packet from a host at a first hop router in a network site, the first hop router in communication with a core network and operable to encapsulate packets received from the host for transmission to a remote network site, setting a status for the host in a table at the first hop router as active, starting a timer for the host at the first hop router, transmitting a probe message from the first hop router to the host if a packet is not received at the first hop router from the host before the timer expires, updating the status of the host at the table based on whether a response message is received from the host, and using the host status to detect host migration. An apparatus and logic are also disclosed herein.

20 Claims, 4 Drawing Sheets

PROACTIVE DETECTION OF HOST STATUS IN A COMMUNICATIONS NETWORK

TECHNICAL FIELD

The present disclosure relates generally to communication networks, and more particularly, to detection of host status in a communications network.

BACKGROUND

The increasing use of virtualization in networks has enabled a great amount of flexibility in managing servers and workloads. One important aspect of this flexibility is mobility. Detection of host moves and status in conventional systems have a number of drawbacks, including time for detection, limitations of detection based on type of traffic, and high amount of processing resources needed.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
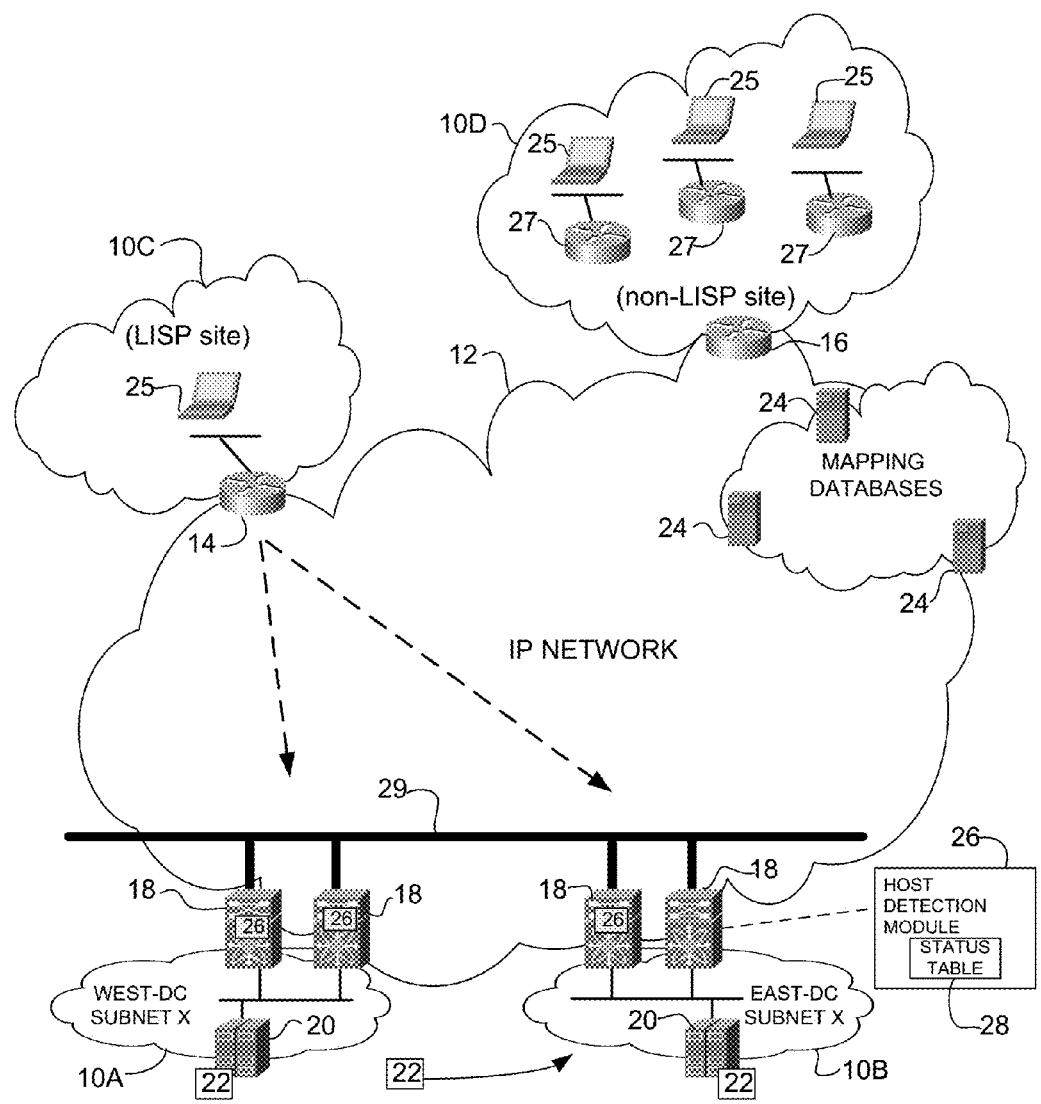
FIG. 1 illustrates an example of a network in which embodiments described herein may be implemented.

In one embodiment, a method generally comprises receiving a packet from a host at a first hop router in a network site, the first hop router in communication with a core network and operable to encapsulate packets received from the host for transmission to a remote network site, setting a status for the host in a table at the first hop router as active, starting a timer for the host at the first hop router, transmitting a probe message from the first hop router to the host if a packet is not received at the first hop router from the host before the timer expires, updating the status of the host at the table based on whether a response message is received from the host, and using the host status to detect host migration.

In another embodiment, an apparatus generally comprises a processor for processing a packet received from a host at a first hop router in a network site, setting a status for the host in a table at the first hop router as active, starting a timer for the host at the first hop router, transmitting a probe message from the first hop router to the host if a packet is not received at the first hop router from the host before the timer expires, and updating the status of the host at the table based on whether a response message is received from the host. The apparatus further comprises memory for storing the table. The first hop router is operable to encapsulate packets received from the host for transmission to a remote network site and use said host status to detect host migration.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In a network environment such as data center interconnect (DCI), a first hop router (FHR) should be able to detect host moves, provide a consistent first hop presence, and monitor host status (e.g., aliveness). If the detection is based on ARP (Address Resolution Protocol)/ping, there may be a problem if the host is silent (e.g., no ARP, only traffic transmitted from host).

Locator Identifier Separation Protocol (LISP) is an example of a protocol that uses routing locators and endpoint identifiers to improve the scalability of a routing system. The LISP architecture provides a mechanism to separate out identification and location semantics from the current definition of an IP address. IP address semantics are extended to incorporate a distinction between routing locators (RLOCs) for routing through core networks and endpoint identifiers (EIDs) for identifying network sessions between devices.

A first hop router in a LISP architecture (e.g., LISP xTR (ingress tunnel router (ITR)/egress tunnel router (ETR)), may detect hosts from an IP (Internet Protocol) packet transmitted to an xTR's gateway MAC (Media Access Control) address or from an ARP request. The first hop router may support periodic aliveness checks in order to track the status of hosts, however, there are a number of drawbacks with this approach. For example, the first hop router may be unable to detect multicast traffic and broadcast traffic. Also, the periodic aliveness check may consume high CPU (Central Processing Unit) resources and it may take time for the aliveness check to detect the status of the host.

The embodiments described herein provide a proactive approach to detect host status (e.g., host failure, host location, host migration). In certain embodiments, a table (e.g., binding table, status table) is created on the first hop router for collecting information about active hosts. A probe mechanism may run based on information in the binding table. If a host is active, the first hop router may just monitor and maintain the table, without sending out any probe messages. If a host is idle (e.g., no packet/ARP for a specified interval), the first hop router may send a probe message to the host to check if the host is alive. The embodiments may be suitable for large scale deployments and the flexibility of the proactive probe mechanism may provide an improvement in convergence time in the case of host failure or roaming. Also, the embodiments do not rely on ARP messages to detect a host move and may detect host status in the presence of multicast and broadcast traffic.

Referring now to the drawings, and first to FIG. 1, an example of a network in which embodiments described herein may be implemented is shown. A plurality of network sites (e.g., data center, group of network devices) 10A, 10B, 10C, 10D are in communication through a network 12 (e.g., L2 metro Ethernet core, L3 IP network, MPLS, or any other type of network). Each network site 10A, 10B, 10C, 10D and core network 12 may include any number of edge devices or intermediate (core) nodes (e.g., routers, switches, access layer devices, gateways, or other network devices), which facilitate passage of data within the network.

The network shown in the example of FIG. 1 includes LISP network sites (10A, 10B, 10C), each comprising an edge device 14, 18 configured to perform xTR (ingress tunnel router (ITR)/egress tunnel router (ETR)) functions. The edge devices 14, 18 may be routers, switches, gateways, or other network devices configured to perform routing or forwarding functions (e.g., L2, L3, or L2/L3 devices) and support a locator/identifier split method. In one embodiment, the edge devices 14, 18 are configured for operation in accordance with LISP. As previously described, LISP creates two address (name) spaces; endpoint identifiers (EIDs), which are assigned to endpoints, and routing locators (RLOCs), which are assigned to network devices to indicate a location within the network topology. EID reachability across LISP sites 10A, 10B, and 10C is achieved by resolving EID-to-RLOC mappings. Reachability within the RLOC space (e.g., network 12) is achieved by traditional routing methods.

It is to be understood that LISP is used herein as an example and that other protocols that provide a locator/identifier split may be used, without departing from the scope of the embodiments. Thus, the term "locator identifier separation protocol" as used herein may refer to any protocol that provides a separation between an object identifier and its location.

Network sites 10C and 10D may include any number of endpoints (stations, user devices, clients, client devices) 25. The endpoint 25 may comprise, for example, a personal computer, set-top box, telepresence device, television, cellular phone, tablet, laptop, personal digital assistant, portable computing device, multimedia device, and the like.

Non-LISP network site 10D includes an edge device 16 in communication with routers 27. The network site 10D is not configured as a LISP site, and therefore does not include an xTR. Edge device 16 may be configured to perform proxy xTR (PxTR) functions. The PxTR 16 allows a non-LISP site (e.g., site 10D) to interoperate with a LISP site (e.g., sites 10A, 10B, and 10C).

The example shown in FIG. 1 includes an extended subnet X between two data centers (network sites 10A and 10B). The subnet may extend from a west data center (west-DC) to an east data center (east-DC) using a LAN (Local Area Network) extension 29 (e.g., OTV (Overlay Transport Virtualization), VPLS (Virtual Private LAN Service), or other LAN extension technology). Edge devices 18 at network sites 10A, 10B are in communication with one or more servers 20 in a LAN (Local Area Network), for example. The servers 20 may comprise any number of hosts (e.g., virtual machines (VMs), workloads (applications)) 22. The hosts 22 may migrate between servers 20 as indicated at FIG. 1 (e.g., move of VM 22 from site 10A to site 10B). Virtual machines and other endpoints may be deployed anywhere in the data center and can move freely across racks, rows, or different data center locations. As described below, virtual machine migration events are dynamically detected by the edge devices 18.

The edge devices 18 at data centers 10A, 10B may be, for example, a gateway, switch, router, or other network device. The edge devices 18 are referred to herein as first hop routers (FHRs) since they are a first hop between the network site 10A, 10B (LAN/server 20) and the core network 12. The term 'first hop router' as used herein may refer to a router, switch, router/switch, gateway, or other network device operable to perform routing or forwarding functions. The edge device 18 may also be referred to as a LISP-VM xTR (router). The LISP-VM router's IP address may be used as the locator (RLOC) for encapsulation of traffic to and from the dynamic EID. For example, the edge device 18 may implement ingress tunnel router and egress tunnel router functions (e.g., operate as xTR). The edge devices 18 are operable to receive packets from site-facing interfaces (e.g., hosts 22) and encapsulate them for transmission to remote LISP sites (e.g., network sites 10A, 10B, 10C) or natively forward the packets to non-LISP sites (e.g., network site 10D). The edge devices 18 are also operable to receive packets from core-facing interfaces (e.g., network 12), decapsulate LISP packets, and deliver them to local EIDs at their network site 10A, 10B.

The network further includes a mapping system comprising a plurality of mapping databases (servers) 24. In one embodiment, the mapping system comprises a map server/map resolver (MS/MR). The mapping system may include any number of map servers, map resolvers, or map databases distributed throughout the network. For example, the mapping system may comprise any number of physical or virtual devices located in one or more networks and may include one or more databases stored on one or more network devices. In one example, the map server (MS) implements the mapping database distribution by accepting registration requests from its client ETRs, aggregating the EID prefixes, and advertising the aggregated prefixes. The map resolver (MR) accepts encapsulated map-request messages sent by ITRs, decapsulates them, and then forwards them toward the ETRs responsible for the EIDs being requested. Each ITR maintains a cache of the mapping database entries that it needs at a particular time. It is to be understood that the mapping system described herein is only an example and that other mapping systems and databases 24 may be used without departing from the scope of the embodiments.

As described in detail below, one or more of the first hop routers 18 may comprise a host detection module 26 operable to maintain a status (binding) table 28. The table 28 is used to collect information about active hosts 22. In certain embodiments, the host detection module 26 comprises a proactive probe mechanism that runs based on the binding table 28. If the host 22 is active, the first hop router 18 monitors and maintains the table 28 and no probe messages are transmitted. If the host 22 is idle, the first hop router 18 may send a probe message to the host 22 to check whether the host is alive.

The host detection module 26 may be used to detect host moves and monitor host aliveness. For example, any IP addressable device (e.g., VM 22) may move (roam) from its subnet to a different subnet or to an extension of its subnet in a different location (e.g., remote data center), while keeping its original IP address. The embodiments described herein allow for detection of host migration by the first hop router (e.g., xTR) 18. When a move is detected, the mappings between EIDs and RLOCs are updated by the new xTR. By updating the RLOC-to-EID mappings, traffic is redirected to the new location.

It is to be understood that the network shown in FIG. 1 and described above is only an example and the embodiments described herein may be implemented in networks comprising different network topologies or network devices, without departing from the scope of the embodiments. For example, the network may include any number or type of network devices that facilitate passage of data over the network (e.g., routers, switches, gateways), network elements that operate as endpoints or hosts (e.g., servers, virtual machines, clients), and any number of network sites in communication with any number of core networks. Also, each network site may include any number of edge devices (e.g., xTRs), sources, or receivers. As previously noted, the xTRs are configured to operate in a LISP architecture in the example described herein, however, other locator identifier separation protocols may be used without departing from the scope of the embodiments.

Figure 2:
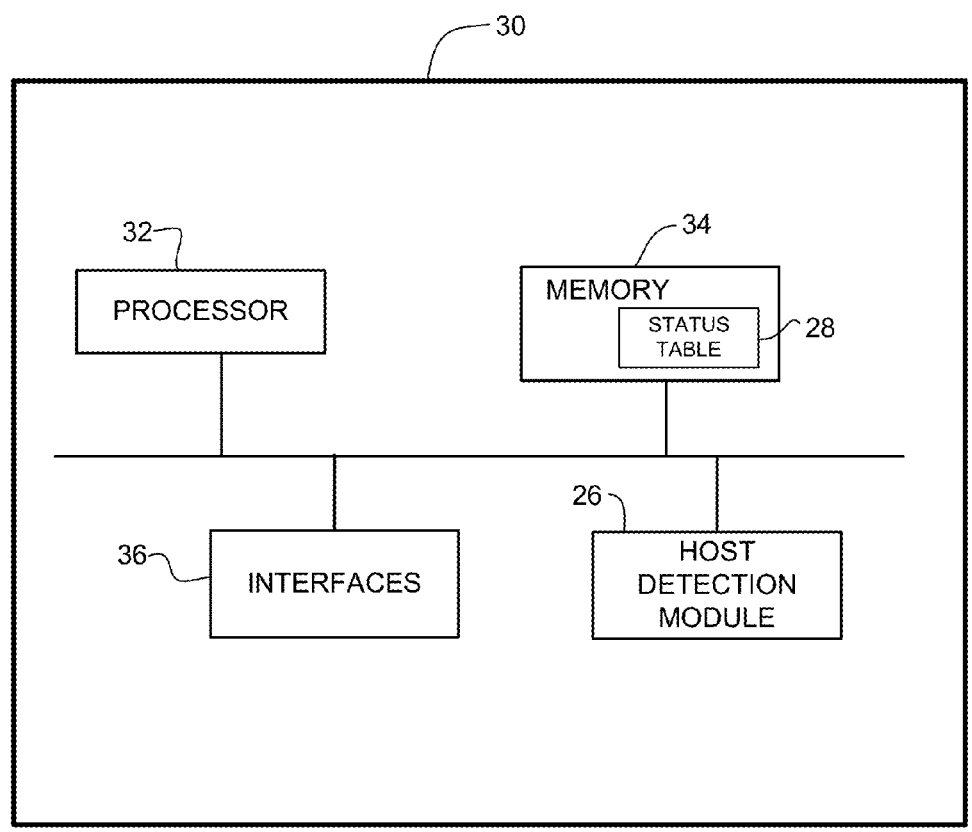
FIG. 2 depicts an example of a network device useful in implementing embodiments described herein.

FIG. 2 illustrates an example of a network device 30 (e.g., first hop router 18 in FIG. 1) that may be used to implement the embodiments described herein. In one embodiment, the network device 30 is a programmable machine that may be implemented in hardware, software, or any combination thereof. The network device 30 includes one or more processor 32, memory 34, network interfaces 36, and host detection module 26.

Memory 34 may be a volatile memory or non-volatile storage, which stores various applications, operating systems, modules, and data for execution and use by the processor 32. Memory 34 may include, for example, the status (binding) table 28, or other suitable data structure for maintaining status information for active hosts. Host detection module 26 (e.g., code, logic, software, etc.) may also be stored in memory 34. The network device 30 may include any number of memory components.

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 30 may include any number of processors 32.

The network interfaces 36 may comprise any number of interfaces (linecards, ports) for receiving data or transmitting data to other devices. The network interface may include, for example, an Ethernet interface for connection to a computer or network.

It is to be understood that the network device 30 shown in FIG. 2 and described above is only an example and that different configurations of network devices may be used. For example, the network device 30 may further include any suitable combination of hardware, software, algorithms, processors, devices, components, modules, or elements operable to facilitate the capabilities described herein.

Figure 3:
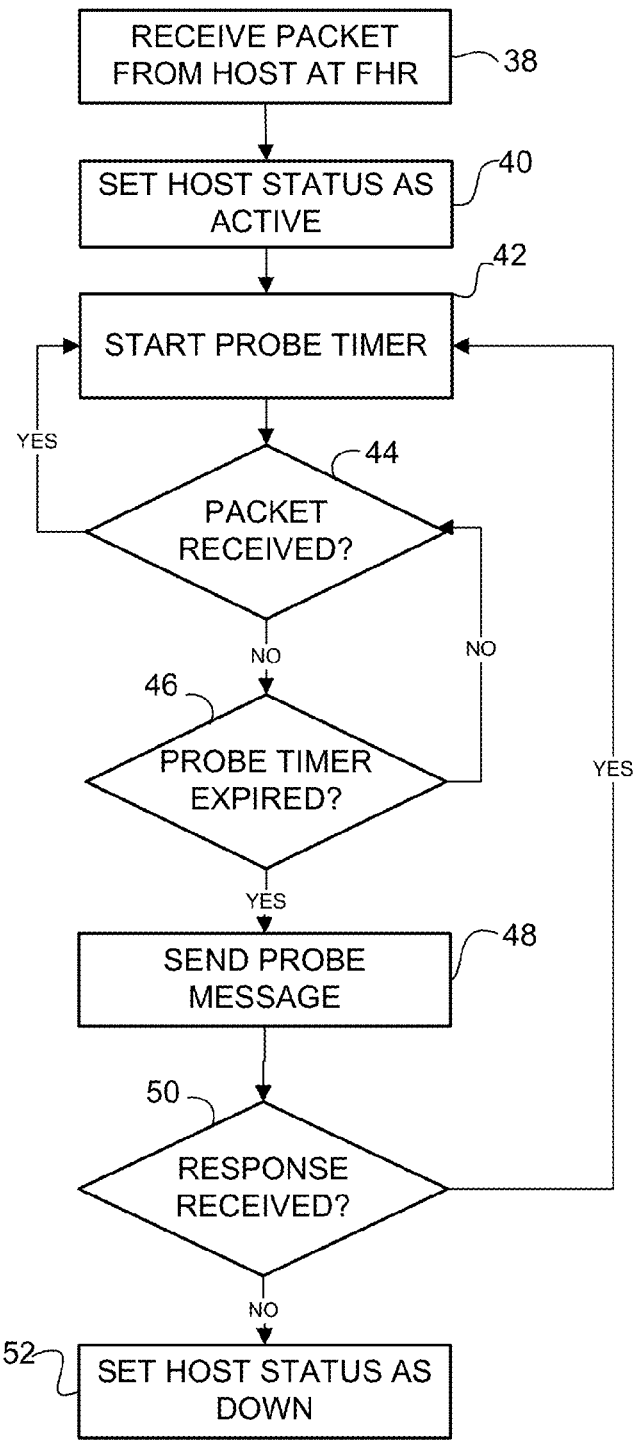
FIG. 3 is a flowchart illustrating an overview of a process for detection of host status, in accordance with one embodiment.

FIG. 3 is a flowchart illustrating an overview of a process for host status detection in accordance with one embodiment. At step 38, an edge device (e.g., FHR 18 in FIG. 1) receives a packet transmitted from a host in the network site (e.g., host 22 in network site 10A in FIG. 1). The first hop router 18 sets the status to active (step 40) and starts a probe timer (step 42). If a packet is received from the host 22 before the probe timer expires, the probe timer is reset (steps 44 and 42). If the probe timer expires and no packet has been received (steps 44 and 46) (i.e., no packets from the host detected within timer interval), a probe message is sent to the host 22 to check the status of the host (step 48). The status of the host is updated based on whether a response message is received from the host. If the host responds to the probe message, the probe timer is started (steps 50 and 42). If no response is received, the first hop router 18 changes the status in the binding table 28 for the host 22 to down (steps 50 and 52).

It is to be understood that the process shown in FIG. 3 and described above is only an example and that steps may be added, combined, or modified without departing from the scope of the embodiments.

Table I illustrates an example of the status table 28 stored at the first hop router 18:

TABLE I

| HOST | IP ADDRESS | INTER-FACE | STATUS | UP TIME | LAST PACKET |
|---|---|---|---|---|---|
| VM1 | 10.1.0.100/32 | Gi0/0/0.2 | active | 0:00:08 | 0:00:08 |
| VM2 | 10.1.0.200/32 | Gi0/0/0.2 | probe | 0:01:05 | 0:00:05 |
| VM3 | 10.1.0.201/32 | — | down | — | — |
| ... | | | | | |

In the example shown in Table I, the binding table includes a host identifier (e.g., VM1, VM2, VM3, . . . ), IP address for the host, interface at which packets are received from the host, status of the host, up time, and last packet time. The status of the host may be, for example, active (packet or response to probe message received), down (no packet or response to probe message received), or probe (no packet received within timer interval and probe message transmitted). The up time indicates how long the host has been active. The last packet time indicates when a last packet was received from the host.

It is to be understood that Table I shown and described above is only an example and that other data structures comprising additional, less, or different entries may be used without departing from the scope of the embodiments.

Figure 4:
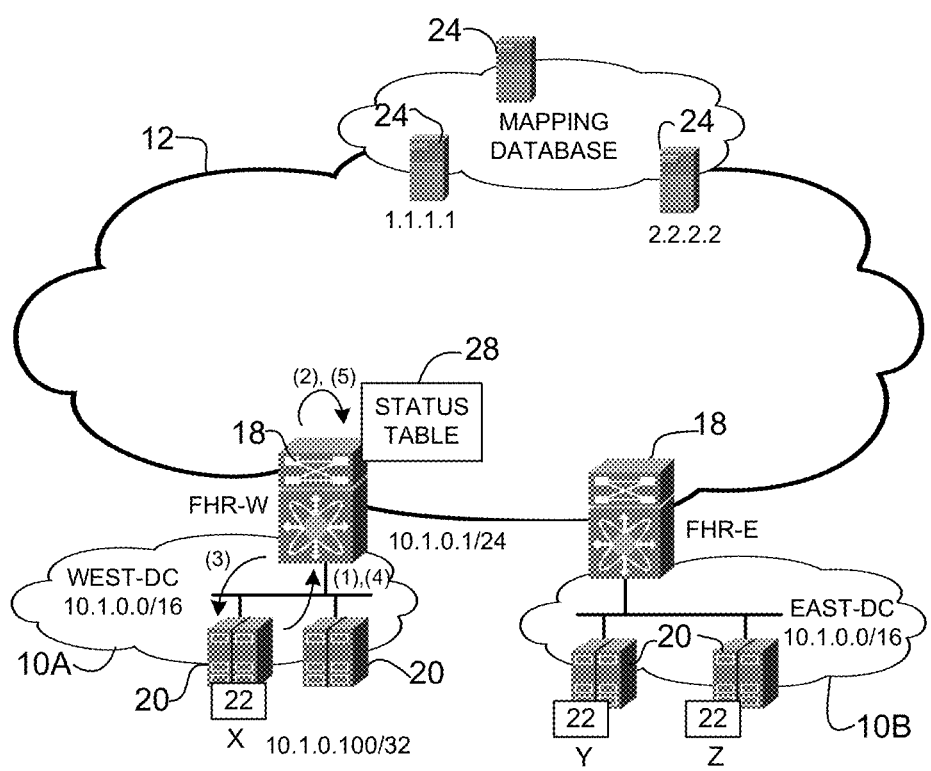
FIG. 4 illustrates an example of host status detection in the network of FIG. 1.

FIG. 4 illustrates an example of host status detection in the network of FIG. 1, in accordance with one embodiment. In this example, the first hop router 18 comprises binding table 28 and receives traffic from host X at network site 10A. The host X (10.1.0.100/32) is alive and sends traffic or an ARP request to the first hop router 18 (indicated at step (1) in FIG. 4). The first hop router 18 receives the packet and verifies the validity of the host 22. The first hop router 18 then checks the status table 28 (step (2)). If host X is not found in the table 28, the first hop router 18 inserts host X into the table (i.e., creates entry for host), sets the status as active, and starts the probe timer. If the host X is found in the table, the first hop router 18 updates the "last packet time" entry for the host, sets the status active, and restarts the probe timer. If the probe timer expires and no packets have been received from host X at the first hop router 18, a proactive probe message is transmitted to host X to check the status of the host (step (3)). The first hop router changes the status of the host in the table 28 to probe. The probe message may be sent with a TTL (time-to-live) equal to 1, for example, to avoid having the message leaked to other network sites. If host X responds to the probe message (step (4)), the first hop router 18 updates the last packet time and starts the timer. If no response is received after a specified period of time, the first hop router may send one or more additional probe messages (e.g., three retires). If no response is received from host X, the first hop router 18 changes the status to down in the binding table (step (5)). If the host is down, this information may be used to identify a failure, or the status of down may indicate a move if the host is detected at another first hop router 18. Thus, the host status detection described herein may be used to detect host migration across network sites (e.g., move-out detection in data center interconnects).

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving a packet from a host at a first hop router in a network site, the first hop router in communication with a core network, the first hop router comprising a tunnel router;
   encapsulating the packet for transmission to a remote network site;
   setting a status for the host in a table at the first hop router as active;
   starting a timer for the host at the first hop router;
   if another packet is not received at the first hop router from the host before the timer expires, transmitting a probe message from the first hop router to the host;
   updating said status of the host at the table based on whether a response message is received from the host; and
   using said host status to detect host migration based on traffic transmitted from the host for update of an endpoint identifier to routing locator mapping;
   wherein a down status of the host indicates a move of the host if the host is detected at another first hop router.

2. The method of claim 1 further comprising creating an entry for the host in the table if the host is not found therein when the packet is received at the first hop router.

3. The method of claim 1 wherein the table comprises an entry indicating a time when a last packet was received from the host and further comprising updating said entry upon receiving the packet.

4. The method of claim 1 wherein updating said status of the host comprises setting the status for the host as active if the response message is received from the host and changing the status to down if no response message is received from the host.

5. The method of claim 1 further comprising transmitting at least one more probe message if no response message is received within a specified period of time.

6. The method of claim 1 wherein the host comprises a virtual machine and the packet comprises multicast or broadcast traffic.

7. The method of claim 1 wherein the network sites comprise data centers comprising one or more subnets.

8. The method of claim 1 wherein the first hop router supports a locator and identifier split protocol.

9. The method of claim 1 wherein the first hop router is in communication with a mapping system comprising endpoint identifier to route locator mappings.

10. An apparatus comprising:
    a processor for processing a packet received from a host at a first hop router in a network site, setting a status for the host in a table at the first hop router as active, starting a timer for the host at the first hop router, transmitting a probe message from the first hop router to the host if a packet is not received at the first hop router from the host before the timer expires, and updating said status of the host at the table based on whether a response message is received from the host; and
    memory for storing the table;
    wherein the first hop router is operable to encapsulate packets received from the host for transmission to a remote network site and use said host status to detect host migration; and
    wherein the host status is used to detect host migration based on traffic transmitted from the host for update of an endpoint identifier to routing locator mapping and a down status of the host indicates a move of the host if the host is detected at another first hop router.

11. The apparatus of claim 10 wherein the processor is further operable to create an entry for the host in the table if the host is not found therein when the packet is received at the first hop router.

12. The apparatus of claim 10 wherein the table comprises an entry indicating a time when a last packet was received and wherein the processor is further operable to update said entry upon receiving the packet.

13. The apparatus of claim 10 wherein updating said status of the host comprises setting the status for the host as active if the response message is received from the host and changing the status to down if no response message is received from the host.

14. The apparatus of claim 10 wherein the processor is further operable to transmit at least one more probe message if no response message is received within a specified period of time.

15. The apparatus of claim 10 wherein the host comprises a virtual machine.

16. The apparatus of claim 10 wherein the network sites comprise data centers comprising one or more subnets.

17. The apparatus of claim 10 wherein the apparatus supports a locator and identifier split protocol.

18. The apparatus of claim 10 wherein the apparatus is configured for communication with a mapping system comprising endpoint identifier to route locator mappings.

19. Logic encoded on one or more non-transitory computer readable media for execution and when executed by a processor is configured to:
    process a packet received from a host at a first hop router in a network site, the first hop router operable to encapsulate packets received from the host for transmission over a core network;
    set a status for the host in a table at the first hop router as active;
    start a timer for the host at the first hop router;
    if a packet is not received at the first hop router from the host before the timer expires, transmit a probe message from the first hop router to the host;
    update said status of the host at the table based on whether a response message is received from the host; and
    use said host status to detect host migration between network sites based on traffic transmitted from the host for update of an endpoint identifier to routing locator mapping;
    wherein a down status of the host indicates a move of the host if the host is detected at another first hop router.

20. The logic of claim 19 wherein the processor is operable to support a locator and identifier split protocol.

* * * * *